US011300649B1

(12) United States Patent
Lacaze et al.

(10) Patent No.: US 11,300,649 B1
(45) Date of Patent: Apr. 12, 2022

(54) VEHICLE LOCALIZATION AUGMENTATION FOR DISMOUNTS

(71) Applicant: ROBOTIC RESEARCH OPCO, LLC, Clarksburg, MD (US)

(72) Inventors: Alberto Daniel Lacaze, Potomac, MD (US); Karl Nicholas Murphy, Cocoa Beach, FL (US)

(73) Assignee: ROBOTIC RESEARCH OPCO, LLC, Clarksburg, MD (US)

( * ) Notice: Subject to any disclaimer, the term of this patent is extended or adjusted under 35 U.S.C. 154(b) by 0 days.

(21) Appl. No.: 15/961,792

(22) Filed: Apr. 24, 2018

Related U.S. Application Data

(60) Provisional application No. 62/524,484, filed on Jun. 24, 2017.

(51) Int. Cl.
*G01S 5/02* (2010.01)
*G01S 5/14* (2006.01)

(52) U.S. Cl.
CPC .......... *G01S 5/0289* (2013.01); *G01S 5/0263* (2013.01); *G01S 5/14* (2013.01)

(58) Field of Classification Search
CPC ......... G01S 5/0289; G01S 5/0263; G01S 5/14
See application file for complete search history.

(56) References Cited

U.S. PATENT DOCUMENTS

| 9,423,489 | B2 * | 8/2016 | Oehler | G01S 5/0247 |
| 9,593,953 | B2 * | 3/2017 | Lee | G01C 21/26 |
| 9,812,015 | B1 * | 11/2017 | Cox | H04W 4/44 |
| 9,881,503 | B1 * | 1/2018 | Goldman-Shenhar | G05D 1/0088 |
| 10,488,860 | B1 * | 11/2019 | Koch | G06F 16/9537 |
| 2013/0053061 | A1 * | 2/2013 | Kang | G01S 5/0289 455/456.1 |
| 2013/0282274 | A1 * | 10/2013 | Hernando | G01C 22/025 701/472 |

(Continued)

OTHER PUBLICATIONS

Paul Olson, US Army Cerdec Dismounted Solder Navigation—Update, 2012, US Army Rdecom, located at https://web.wpi.edu/Images/CMS/ECE/Paul_Olson_2012_Presentation.pdf (Year: 2012).*

*Primary Examiner* — Frederick M Brushaber
(74) *Attorney, Agent, or Firm* — RowanTree Law Group, PLLC; Frederick F. Rosenberger

(57) ABSTRACT

A Vehicle Localization Augmentation for Dismounts (VLAD), which extends the technology used by dismount localization systems to include the capability of riding and aligning inertial systems to a vehicle. VLAD takes the proven Warfighter's Integrated Navigation System (WINS) and, when appropriate, increases capabilities by investigating aiding sensors, algorithms, and frameworks to align dismount inertial sensors to vehicle inertial sensors. The two focuses of this effort are initialization and maintaining the solution quality. Initialization is the process where an inertial unit calculates sensor biases in an effort to minimize systemic errors in the localization solution. This process is highly related to the sensor being used. High quality sensors, for example, perform a gyrocompassing operation on initialization. Gyrocompassing measures the Earth's rotation and gives the absolute heading relative to the Earth. On man-portable inertial systems, this process can take 15 minutes.

14 Claims, 5 Drawing Sheets

(56) References Cited

U.S. PATENT DOCUMENTS

| | | | | |
|---|---|---|---|---|
| 2014/0244163 A1* | 8/2014 | Zhao | ................... | G01C 21/165 |
| | | | | 701/445 |
| 2015/0029014 A1* | 1/2015 | Bande | ................... | G08B 21/18 |
| | | | | 340/439 |
| 2015/0077282 A1* | 3/2015 | Mohamadi | .............. | G01S 7/415 |
| | | | | 342/27 |
| 2015/0149042 A1* | 5/2015 | Cooper | .................. | H04W 4/48 |
| | | | | 701/48 |
| 2015/0339823 A1* | 11/2015 | Siomina | ................ | G01C 21/20 |
| | | | | 348/135 |
| 2016/0088422 A1* | 3/2016 | Foster | .................. | G01S 5/0263 |
| | | | | 455/41.2 |
| 2016/0187128 A1* | 6/2016 | Zhang | .................. | H04W 4/027 |
| | | | | 702/150 |
| 2017/0012721 A1* | 1/2017 | Okamoto | ............ | H04B 17/318 |
| 2017/0090010 A1* | 3/2017 | Dackefjord | .............. | G01S 5/10 |
| 2018/0059209 A1* | 3/2018 | Cuddihy | .............. | G01S 5/0252 |
| 2018/0270783 A1* | 9/2018 | Venkatraman | ............ | G01S 5/12 |
| 2018/0286243 A1* | 10/2018 | Sivashankar | ......... | B60W 50/14 |
| 2018/0359604 A1* | 12/2018 | Chen | ................... | H04W 4/025 |

\* cited by examiner

VEHICLE LOCALIZATION AUGMENTATION FOR DISMOUNTS

CROSS REFERENCE TO RELATED APPLICATIONS

This application claims priority from U.S. Patent Application Ser. No. 62/524,484, entitled "Vehicle Localization Augmentation for Dismounts", filed on Jun. 24, 2017. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to dismount localization systems. More specifically, the present invention relates to a suite of sensor processing algorithms and techniques that will result in the dismount localization system initializing and maintaining a good result while riding in a vehicle.

BACKGROUND OF THE INVENTION

Dismount localization systems provide real-time position estimates for the modern warfighter. These systems typically are robust to GPS denial, jamming, and/or spoofing.

GPS has well-known limitations, including the inability to function in urban canyons, inside most buildings, or underground. GPS is also susceptible to jamming or spoofing: a hostile party actively stops GPS signals from being received or mimics a GPS satellite in a way that negatively impacts receiver performance. In a more extreme case, should a war between a global power and the US occur, it is likely that GPS and other satellites would be targeted in attacks. In 2007, China proved their ability to destroy satellites. Russia, Israel, and India are actively developing or have the same capability. As time progresses, other countries will follow.

Should a large conflict arise, the GPS satellite constellation is not necessarily safe. If GPS capabilities are significantly disrupted, the US military should be prepared, including during airborne insertions.

Consider the case where a modem warfighter is riding in a Mine-Resistant Ambush Protected (MRAP) that is equipped with a localization system. The warfighter has a dismount localization system. After ten minutes, the MRAP's localization system is giving an accurate position solution, while the dismount's localization system is giving a poor position solution. The described case is common. Why?

There are several key factors. The first is that localization systems designed for ground vehicles frequently make use of wheel encoders, which measure wheel rotation. Wheel encoders reduce error in the vehicle's accelerometers. The dismount's localization system has no such correction to the accelerometers. The second factor impacting accuracy is that the dismount's inertial sensors tend to be lower quality than a vehicle's. The reason has to do with a combination of size, weight, and cost of the vehicle's sensor. Some sensors are just unsuitable and/or cost-prohibitive for dismounts.

The goal of the present invention is to create a suite of sensor processing algorithms and techniques that will result in the dismount localization system initializing and maintaining a good result while riding in a vehicle. The result of the present invention is that a user will be able to seamlessly exit the vehicle and perform their mission, all while still maintaining a high accuracy localization solution.

SUMMARY OF THE INVENTION

The present invention is a Vehicle Localization Augmentation for Dismounts (VLAD), which extends the technology used by dismount localization systems to include the capability of riding and aligning inertial systems to a vehicle. VLAD takes the proven Warfighter's Integrated Navigation System (WINS) and, when appropriate, increases capabilities by investigating aiding sensors, algorithms, and frameworks to align dismount inertial sensors to vehicle inertial sensors.

The proposed Vehicle Localization Augmentation for Dismounts (VLAD) effort is to enhance dismount localization systems to make use of vehicle alignment to streamline initialization and alignment of the dismount systems to the world. For this work, the team will make use of CERDEC's Warfighter's Integrated Navigational System (WINS) as the testbed system.

However, when WINS is not available, the team will utilize the present invention system. For a vehicle, the team will utilize a vehicle equipped with a vehicle navigation system, which is a vehicle navigation sensor.

The two focuses of this effort are initialization and maintaining the solution quality. Initialization is the process where an inertial unit calculates sensor biases in an effort to minimize systemic errors in the localization solution. This process is highly related to the sensor being used. High quality sensors, for example, perform a gyrocompassing operation on initialization. Gyrocompassing measures the Earth's rotation and gives the absolute heading relative to the Earth. On man-portable inertial systems, this process can take 15 minutes. Most dismount localization systems do not have sensors that can gyrocompass. The reason is because the underlying Inertial Measurement Unit (IMU) sensor has sensor noise larger than the Earth's rotation.

Thus, many such systems require initialization time less than four minutes, which is a significant amount of time for a warfighter seeking to perform a mission. Similar to gyrocompassing, the sensor must remain as still as possible, though it is typically less sensitive to motion than the gyrocompassing operation. Thus, one focus is to use the time in the vehicle, knowledge of the vehicle's motion, the location of the dismount's inertial system within the vehicle, and the dismount inertial sensor data to properly initialize the localization system.

The second focus is to align the dismount localization to the world (e.g., compute a valid latitude, longitude, and altitude for the user) while the vehicle is driving. After a dismount localization system initializes its inertial sensor, all calculated position solutions are relative to the start location. This relative solution is true for inertial sensors of all qualities, including those capable of gyrocompassing.

Thus, an absolute position is required, either via user input or a sensor like GPS. Thus, some alignment to the world is necessary. It is assumed that the navigation system on the vehicle has a valid global initialization at some time in its past. Given this knowledge, the location of the dismount localization sensor relative to the vehicle, and the data from the dismount localization sensor, it is possible to accurately initialize the dismount localization solution to the Earth.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
FIG. 1 illustrates the lace-mounted present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The proposed Vehicle Localization Augmentation for Dismounts (VLAD) effort is to enhance dismount localization systems to make use of vehicle alignment to streamline initialization and alignment of the dismount systems to the world. For this work, the team will make use of CERDEC's Warfighter's Integrated Navigational System (WINS) as the testbed system. However, when WINS is not available, the team will utilize Robotic Research's (RR) proven The present invention system. For a vehicle, the team will utilize a vehicle equipped with one of the inventor's vehicle navigation systems, which is a vehicle navigation sensor.

The two focuses of this effort are initialization and maintaining the solution quality. Initialization is the process where an inertial unit calculates sensor biases in an effort to minimize systemic errors in the localization solution. This process is highly related to the sensor being used. High quality sensors, for example, perform a gyrocompassing operation on initialization. Gyrocompassing measures the Earth's rotation and gives the absolute heading relative to the Earth. On man-portable inertial systems, this process can take 15 minutes.

Most dismount localization systems do not have sensors that can gyrocompass. The reason is because the underlying Inertial Measurement Unit (IMU) sensor has sensor noise larger than the Earth's rotation. Thus, many such systems require initialization time less than four minutes, which is a significant amount of time for a warfighter seeking to perform a mission. Similar to gyrocompassing, the sensor must remain as still as possible, though it is typically less sensitive to motion than the gyrocompassing operation.

Thus, one focus is to use the time in the vehicle, knowledge of the vehicle's motion, the location of the dismount's inertial system within the vehicle, and the dismount inertial sensor data to properly initialize the localization system.

The second focus is to align the dismount localization to the world (e.g., compute a valid latitude, longitude, and altitude for the user) while the vehicle is driving. After a dismount localization system initializes its inertial sensor, all calculated position solutions are relative to the start location. This relative solution is true for inertial sensors of all qualities, including those capable of gyrocompassing.

Thus, an absolute position is required, either via user input or a sensor like GPS. Thus, some alignment to the world is necessary. It is assumed that the navigation system on the vehicle has a valid global initialization at some time in its past. Given this knowledge, the location of the dismount localization sensor relative to the vehicle, and the data from the dismount localization sensor, it is possible to accurately initialize the dismount localization solution to the Earth.

The sensors described are intended to be utilized when access to CERDEC's WINS is not available as a testbed. These technologies are surrogates and are intended to facilitate quick development of base algorithms and techniques that can be transitioned to WINS. This effort seeks to build an architecture that proves feasibility of the proposed approach.

Ranging radios are devices that are embedded in many of the inventor's robots, vehicles, and devices. These sensors measure range between two ranging radio sensors. They function using two-way time of flight via a ping-pong approach. One sensor will initiate communication, and the other will respond. After five transmissions, time of flight between the devices can be computed. Using the speed of light, the time can be converted into distance. Note that the number of transmissions is high because the algorithms do not assume that clocks on the sensors are synchronized. If clocks are synchronized, fewer transmissions are required.

The ranging radio's range depends on its height and the environment. In open spaces, a range of about 100 meters can be achieved at about chair height. On the ground, this range drops to around 30 meters. In subterranean environments, wherein multipath is frequent, the Inventors have seen ranges up to 400 meters. These measurements are thought to be inaccurate due to the multipath.

Figure 2:
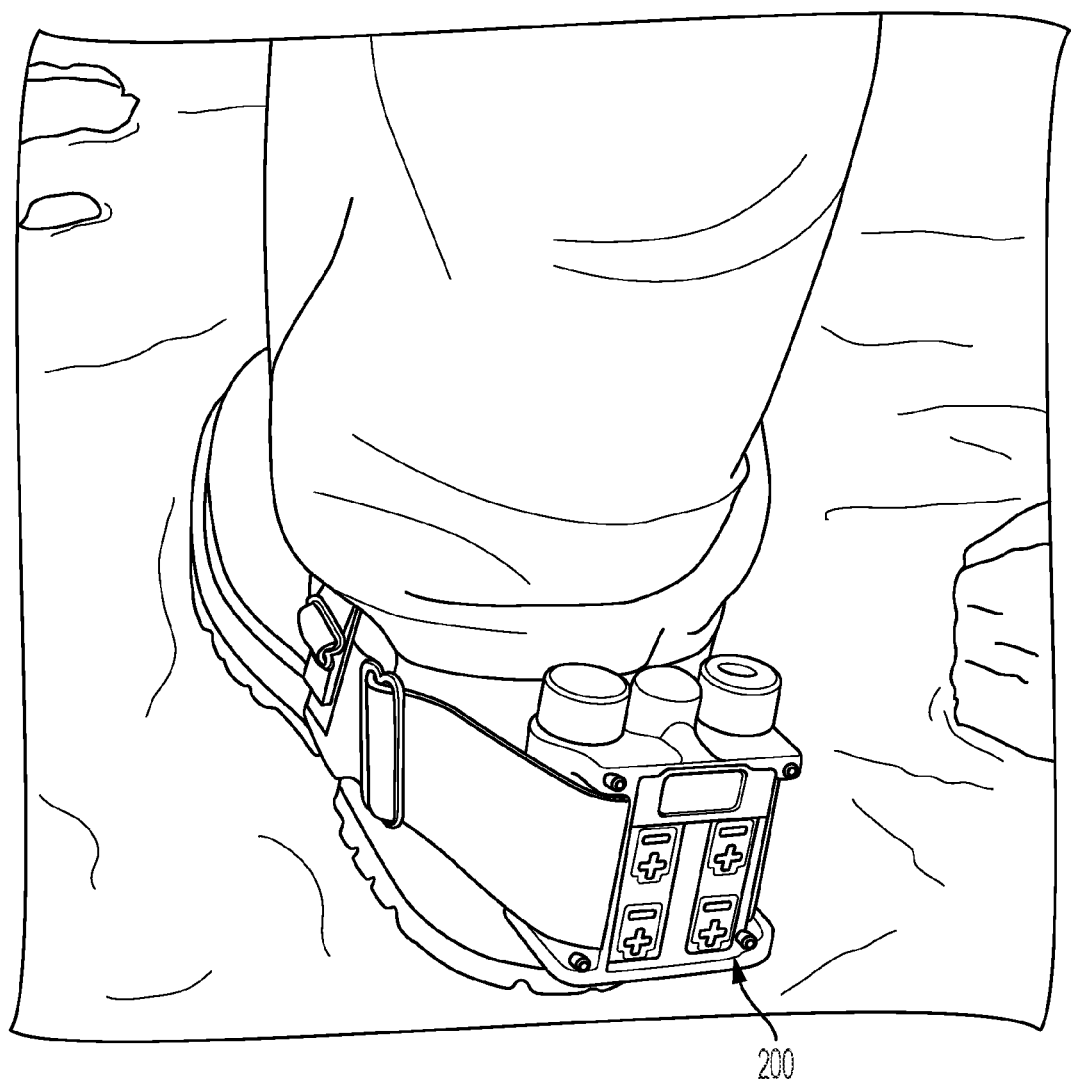
FIG. 2 illustrates the heel-mounted present invention.

The present invention, shown in FIG. 1, is one of the inventor's core products. The present invention is a GPS-denied boot-worn localization device 100. FIG. 2 illustrates the heel-mounted present invention 200.

The present invention possesses a set of capabilities that differentiate it from the other competing systems and are important to the modern warfighter. Such differentiators include performing distributed calculations, still functioning when communications links are severed, already being integrated into Nett Warrior, and functioning with aiding technologies like robotic systems.

Algorithms can be centralized or distributed. Centralized algorithms have a single or limited number of devices compute and share a positioning solution. Centralized approaches are brittle to changing battlefields, wherein computational devices may lose network connectivity or be destroyed. Another competing approach uses a distributed architecture. Each device computes its own and everyone else's solution. There are several benefits to this method. Namely, there are no single points of failure for the system and network traffic can be minimized. Each user's system and any number of command centers can simultaneously provide localization of the entire team—whether outside, inside the facility, or a mix of both.

The present invention algorithms rely upon synchronization of a database between all devices. This synchronization assumes an IP radio like the Rifleman radio, with which the present invention has already been integrated. It is possible that users lose radio connectivity between each other during a mission. If this communications link is lost, even temporarily, the database synchronization will be disrupted. In such a case, data provided locally by the present invention a user is wearing will continue to update.

However, data provided by the present invention that is out of range of the user will not update. If the two users come back within communications range, the databases will be synchronized and the position estimates automatically updated. This behavior is possible, in part, because of the distributed nature of the algorithms.

The present invention utilizes a combination of IMUs and ranging radios that communicate among themselves without the need for a centralized hub. The localization system is completely decentralized, and the ranging radios do not need to communicate with a single main node; they can operate by ranging to each other or to static ranging radio units, which the Inventors call "anchor nodes," left inside or outside of the building.

The system is compatible with Cursor-on-Target, and it is already incorporated into Nett Warrior, an Army-developed communication and mission control smart phone utility. Aspects of the present invention and Nett Warrior have been shown at a variety of events, including the Army Expeditionary Warrior Experiment (AEWE) at Ft. Benning in 2017. The present invention is compatible with other technologies. These technologies include manned ATVs, ground-based robots, legged robots like Boston Dynamics Big Dog, and aerial quadrotors.

The present invention is currently in Low Rate Initial Production (LRIP). In a series of tests conducted in underground facilities across the country, the capabilities of the present invention have been thoroughly proven. Visited sites include Ft. Hood; Ft. Knox; Louisville, Ky.; the Colorado School of Mines; and South Korea.

Currently, the Inventors have sold over 100 units of related localization units to various military and industry customers, including Special Forces groups, the Army 2nd Infantry Division forces, and Customs and Border Patrol (CBP). The Inventors have successfully demonstrated for these groups, in addition to representatives from Virginia Task Force 1 (VA-TF1) international first responders and the New York City Fire Department (FDNY).

The present invention reduces user overburden through low SWaP technology, ease of setup, and having small weight and volume. The present invention specifications are for a single unit disconnected from other users on the network. Government-conducted exercises demonstrate that the Inventors can maintain a squad of at least 24 assets accurately localized (within 5m) for a period of 8 hours in a fully subterranean mission area, and the Inventors have run up to 50 assets in shorter exercises.

The present invention sensor needs to be on or close to the foot. It is not possible to achieve the same level of performance at the same price point if these MEMs inertial sensor-based devices are mounted elsewhere. Securing the device to a user's boot allows a reduction in the inherent errors in the MEMs accelerometers and gyroscopes as the foot contacts the ground.

The present invention, shown in FIG. 1, is one of the inventor's core products. The present invention is a GPS-denied boot-worn localization device 100. FIG. 2 illustrates the heel-mounted embodiment of the present invention 200.

The inventor's research and testing has shown that a device mounted on or near the foot is an order of magnitude more accurate (and substantially more affordable) than a device worn in any other location. For example, the $1,000 MEMs sensor included in The present invention would have to be replaced with $10,000-$15,000 sensor when mounted on a belt or in a backpack to achieve a similar level of performance.

Systems mounted elsewhere that want to maintain low costs are required to make assumptions that have significant drawbacks, including:

Some systems use a magnetic compass to determine heading. This assumption frequently works outdoors and in some wooden structures, but the method does not work well in commercial buildings or underground facilities, which are likely to have significant metal reinforcements, or in close proximity to electrical motors/cables, which will distort the magnetic field.

Assumptions about the gait of the user are used to determine the distance travelled, which constrains the solution to be dependent on the gait type, size of the step, and user. For example, these assumptions would stop a warfighter from being tracked accurately while crawling.

For some systems, if the user-worn device perceives the user to be walking almost straight, then it assumes the user is walking a straight line. This assumption does not work well outside of man-made structures with narrow, straight corridors.

Some systems assume that turns appearing to be almost 90 degrees are actually perfect right angles. This shortcoming was evident at Ft. Hood testing in underground facilities, wherein the corridors are purposely built at odd angles. All systems making these assumptions provided poor overall results.

Most systems that are carried on a belt or backpack need constant contact through a ranging radio to a centralized location; if communications are not available, the systems will accumulate exponentially-growing errors in their location due to the double integration of the accelerometers to compute distance travelled. Thus, unless the facilities are very simple, ranging radio communication with the operators can never be assured. Ranging radios do not use repeaters, and cannot traverse more than a small number of plaster walls.

It is very common that ranging radios are unable to communicate, while voice and data radios, which can use repeaters and lower frequencies, are still fully functional. Once warfighters pass through a metal door, for example, a commander would immediately lose knowledge of their location and their trajectory would not be recoverable.

The present invention does not make any of these assumptions. Its localization solution is user-independent, reliable, and applicable to a large number of diverse missions.

With the inventor's proprietary deployment of the technology, the Inventors have observed that any apprehension in adding these devices to the foot is quickly overcome once the device is used. Feedback that the Inventors have received has been that the users did not even notice that they were wearing the units after a few minutes of usage.

Figure 3:
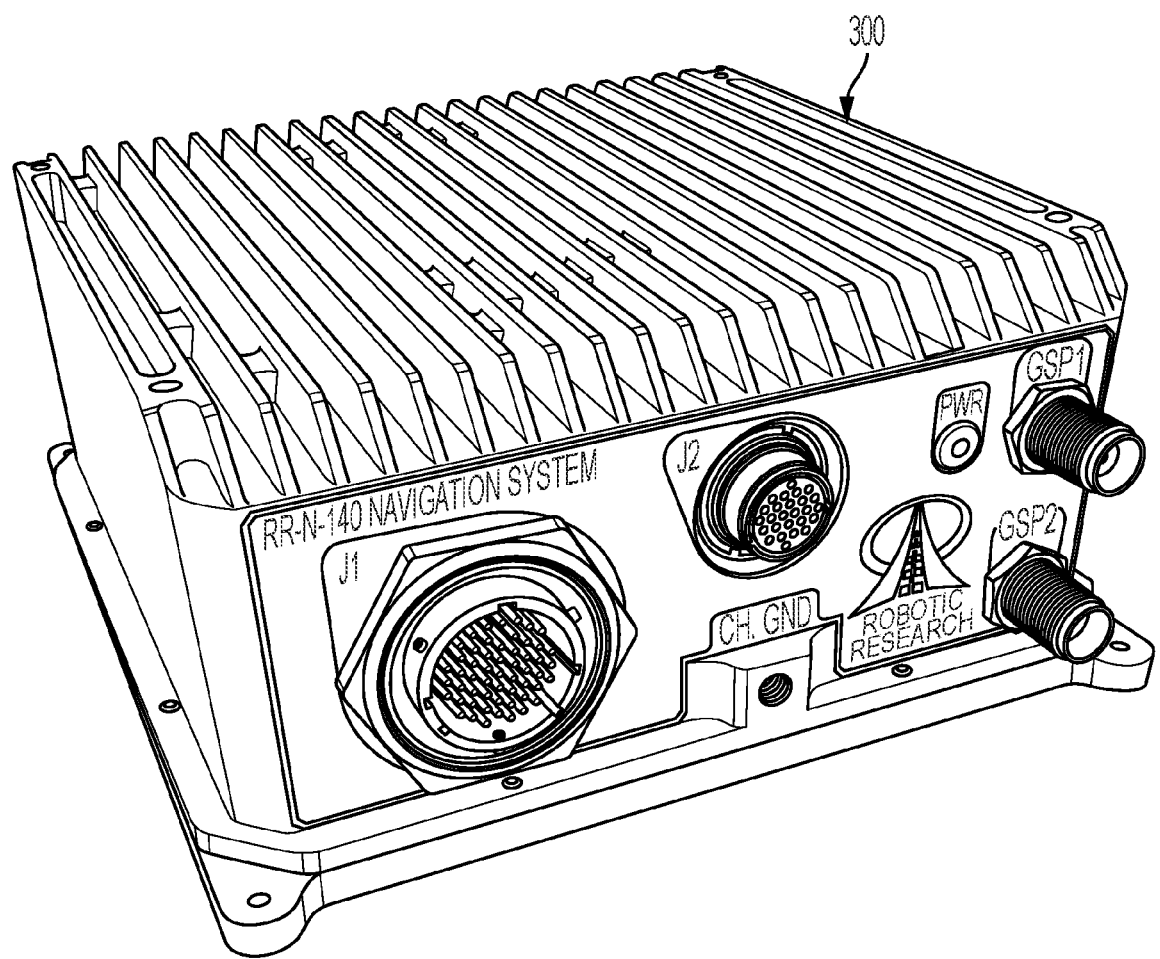
FIG. 3 illustrates a RR-N-140 Vehicle Navigation System. This device provides accurate absolute and relative 3D localization information for ground vehicles of all sizes. It is specifically designed for unmanned ground vehicles and is heavily customizable.

The RR-N-140 Navigation System 300, shown in FIG. 3, provides an accurate absolute and relative 3D localization solution for ground vehicles of all sizes. While it was originally designed for unmanned ground vehicles, it functions with manned ground vehicles as well. The RR-N-140 incorporates inertial sensors, wheel encoders, and GPS.

When available, other aiding sensors (e.g., stereo cameras, LIDAR, and ranging radios) can be used to correct the navigation solution. RR has utilized this device on a wide range of projects, including TARDEC's Autonomous Ground Resupply (AGR) program, which seeks to automate the PLS vehicle, and DTRA's Modular Autonomous Countering WMD System (MACS) program, which put the device on a small unit robotic follower.

Briefly, the goals are to initialize the dismount localization system while riding on a vehicle and to automatically align the dismount's position solution with the world. The prior work did not attempt to address the former focus, and only superficially addressed the latter. Below, a list of key differences between the USSOCOM effort and the proposed effort are listed.

Inertial initialization of the dismount localization system had to occur off of the vehicle. This is the portion of initialization where the inertial system must remain still for long durations. The proposed effort seeks to allow a user to initialize while riding in the vehicle.

For alignment to the world, the inertial system had to be aligned to the world prior to boarding the vehicle. The proposed effort seeks to loosen this restriction and allow world alignment while riding in the vehicle.

When the user-mounted or dismounted the vehicle, the user had to indicate the change to the present invention system. For the USSOCOM effort, the user hit a button on their smart phone. In the proposed effort, the dismount localization system would automatically detect mounting or dismounting the vehicle via the vehicle's ranging radios.

Ranging radios simply give range between devices. These devices behave similarly to GPS. GPS functions by measuring pseudoranges, which represent estimates of range between a GPS receiver and a GPS satellite. Given the location of the satellites, a GPS receiver can compute location from four such pseudoranges that are measured at the same instant. Location is computed with an algorithm called multilateration. Whereas triangulation computes position from angles, multilateration computes position from ranges.

As part of the proposed VLAD effort, the Inventors will equip a vehicle with multiple ranging radios inside the vehicle's cabin. The ranging radios will measure ranges between inertial devices and compute a position of the device relative to the vehicle's interior. This computed position can be used to automatically detect that a user has mounted or dismounted the vehicle.

When the vehicle's navigation system is installed, the vehicle inertial unit's location relative to the vehicle is known. Thus, it is possible to relate the dismount localization system's multilateration position within the vehicle's cabin to the vehicle's inertial systems. Given this information, another algorithm, called transfer alignment, can be applied. Transfer alignment traditionally aligns objects carrying inertial sensors to a vehicle that is carrying those objects.

For example, transfer alignment can be used to initialize and calibrate a missile carried by an aircraft. An issue with the algorithm is that it assumes the objects do not move relative to each other.

For example, the missile's coordinate frame stays relatively fixed relative to the aircraft's coordinate frame, until the missile is fired of course. This assumption does not hold for dismount positioning systems. Depending upon where the sensor is located, the sensor pose (especially heading) can change drastically while inside the vehicle. The main thrust of research for this project is how to extend transfer alignment, or possibly develop a new algorithm, so that the aforementioned assumptions are relaxed or eliminated.

Even though the ultimate target of the technology is CERDEC's WINS system, there is a significant amount of this proposal dedicated to other, similar systems. The purpose of devoting so much time to these other technologies is because of testing and validation. It is difficult to successfully develop technologies when algorithms, sensor processing, and architectures cannot be tested. As such, the Inventors want to build a case that the Inventors can test without the WINS system. That is where the present invention, RR-N-140, and ranging radios become relevant.

The Inventors are in a unique position with regards to this topic because the Inventors have significant amounts of hardware already purchased and installed. This hardware is used on a wide range of programs, but the equipment is not in use all the time.

Thus, it can be adapted and used for this topic to provide stronger evidence than simulation for the validity of the work. The fact that the Inventors can make use of this hardware is critical, especially where budget is extremely limited.

The Inventors intend to try several candidate mechanical designs and algorithmic approaches and assess the viability of each one. The Inventors will narrow the choices of design and algorithm, producing one prototype that can be heavily vetted and iterated during future efforts.

As a result, future efforts would be able to begin implementation of VLAD in order to perform a technical demonstration of the system. By the end, the Inventors would seek to have produced a final version of the product and its software. The Inventors will have iterated through several designs and incorporated both internal feedback and the concerns and suggestions of end users.

Further, the Inventors would seek to test the device in real situations, data from which would help perfect the algorithms implemented. The main goal at the end would be to equip several end-users with the systems and have them successfully use them in a realistic scenario.

Figure 4:
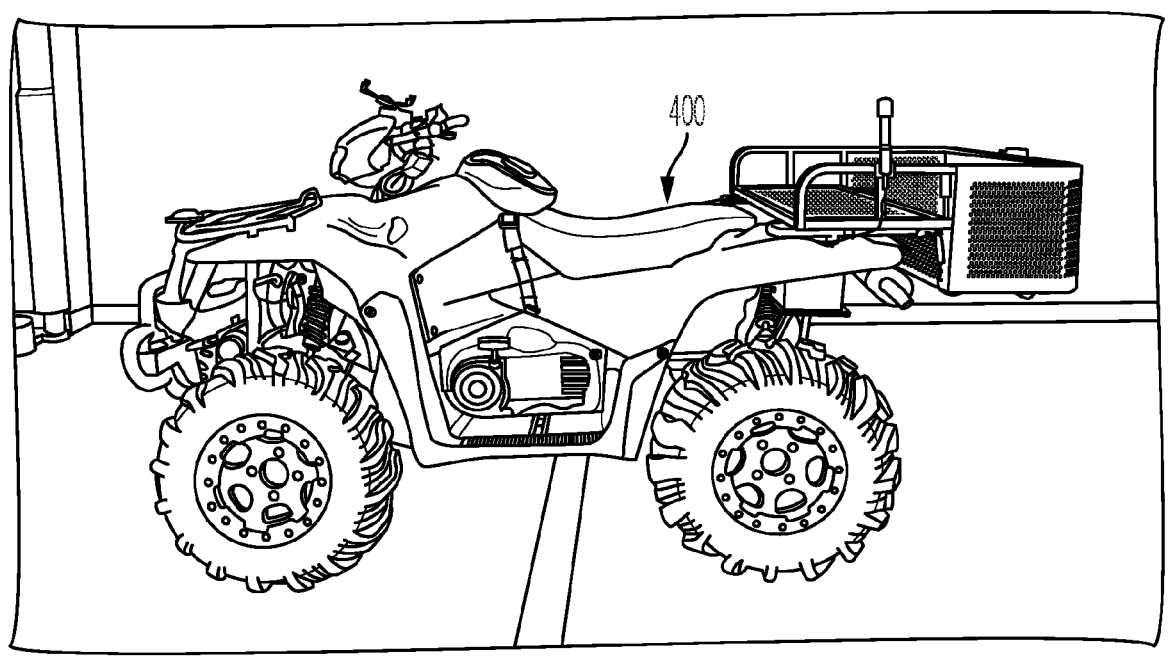
FIG. 4 illustrates a SUZUKI ATV equipped with a RR-N-120 (prior generation of RR-N-140) navigation unit. When a rider boarded the vehicle, the user's present invention VLAD and vehicle navigation solutions would align via ranging radios to maintain the present invention navigation solution while riding the vehicle.

FIG. 4 illustrates a SUZUKI ATV 400 equipped with a RR-N-120 (prior generation of RR-N-140) navigation unit. When a rider boarded the vehicle, the user's present invention VLAD and vehicle navigation solutions would align via ranging radios to maintain the present invention navigation solution while riding the vehicle.

Figure 5:
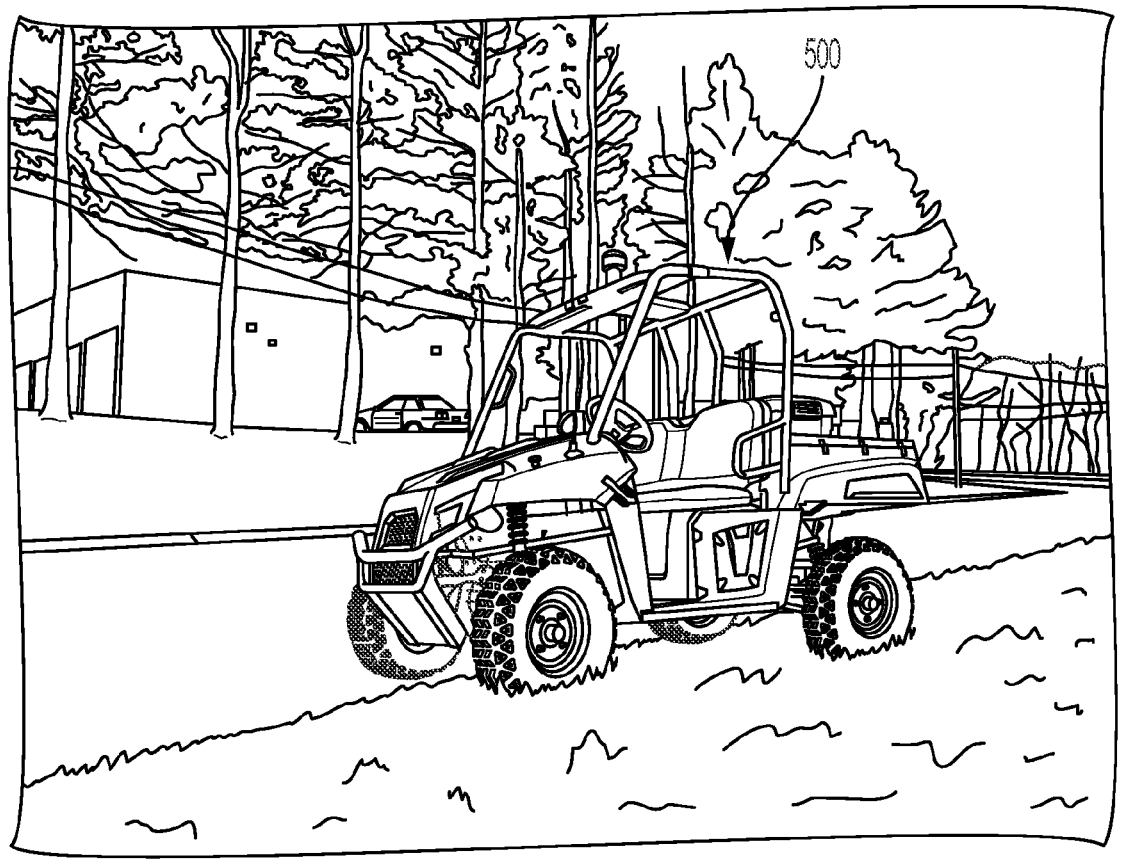
FIG. 5 illustrates a POLARIS vehicle equipped with RR-N-140 navigation system. This Polaris will be used as a surrogate vehicle for testing alignment algorithms developed on this project.

FIG. 5 illustrates a POLARIS vehicle 500 equipped with RR-N-140 navigation system. This Polaris will be used as a surrogate vehicle for testing alignment algorithms developed for the present invention.

The system is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The system can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A system comprising:
    a vehicle;
    a first dismount localization system constructed as a device wearable by a first user, the first dismount localization system comprising:
        a first inertial measurement device;
        one or more second ranging radios; and
        a second computing device; and
    a vehicle localization system mounted on the vehicle, the vehicle localization system comprising:
        a navigation system;
        one or more first ranging radios within an interior of the vehicle; and
        a first computing device configured to determine an absolute position of the vehicle based on signals from the navigation system,
    wherein the second computing device is configured to:
        determine a relative position of the wearable device with respect to the vehicle based on signals from the first inertial measurement device and the one or more second ranging radios; and
        when the first dismount localization system is within the interior of the vehicle, initialize and align the first inertial measurement device based on signals from the one or more second ranging radios indicative of communications between the first and second ranging radios,
    wherein the second computing device is further configured to, when the first dismount localization system is away from the vehicle, determine an absolute position of the first user based at least in part on the absolute position of the vehicle determined by the first computing device and the relative position of the wearable device determined by the second computing device.

2. The system of claim 1, wherein the second computing device employs a transfer alignment algorithm to align the first inertial measurement device when the first dismount localization system is within the interior of the vehicle.

3. The system of claim 2, wherein, in aligning the first inertial measurement device, the second computing device employs separate measurements of acceleration by the vehicle localization system and the first dismount localization system.

4. The system of claim 1, wherein the navigation system comprises a global positioning system (GPS).

5. The system of claim 1, wherein:
    the vehicle localization system further comprises at least one secondary navigation sensor;
    the at least one secondary navigation sensor comprises one or more second inertial measurement devices, one or more wheel encoders, one or more stereo cameras, one or more light detection and ranging (LiDAR) devices, one or more third ranging radios, or any combination of the foregoing; and
    the first computing device is configured to correct an initial absolute position from the navigation system based on signals from the at least one secondary navigation sensor so as to determine the absolute position of the vehicle.

6. The system of claim 1, further comprising a second dismount localization system constructed as a device wearable by a second user, the second dismount localization system comprising:
    a third inertial measurement device;
    one or more fourth ranging radios; and
    a third computing device configured to, when the second dismount localization system is within the interior of the vehicle, initialize and align the third inertial measurement device based on signals from the one or more fourth ranging radios indicative of communications between the first and fourth ranging radios.

7. The system of claim 6, wherein the third computing device is further configured to, when the second dismount localization system is away from the vehicle, determine an absolute position of the second user based at least in part on the absolute position of the vehicle determined by the first computing device, on signals from the third inertial measurement device, and on signals from the one or more fourth ranging radios.

8. The system of claim 7, wherein the third computing device is configured to determine the absolute position of the first user and the second user when both the first and second dismount localization systems are away from the vehicle.

9. The system of claim 8, wherein each of the first and second dismount localization systems comprises a respective database for storing determined positions, and the first and second dismount localization systems are configured to communicate with each other for synchronization of the databases.

10. The system of claim 1, wherein the first inertial measurement device comprises a MEMS-based inertial sensor.

11. The system of claim 1, wherein the first dismount localization system is constructed to be mounted on footwear worn by the first user.

12. The system of claim 1, wherein the second computing device is configured to initialize and align the first inertial measurement device based on signals from the one or more second ranging radios while the first dismount localization system is within the interior of the vehicle and the vehicle is in motion.

13. The system of claim 1, wherein the vehicle localization system comprises at least three of the first ranging radios.

14. A system comprising:
   a vehicle;
   a first dismount localization system constructed as a device wearable by a first user, the first dismount localization system comprising:
      a first inertial measurement device;
      one or more second ranging radios; and
      a second computing device; and
   a vehicle localization system mounted on the vehicle, the vehicle localization system comprising:
      a navigation system;
      one or more first ranging radios within an interior of the vehicle; and
      a first computing device configured to determine an absolute position of the vehicle based on signals from the navigation system,
   wherein the second computing device is configured to:
      determine a relative position of the wearable device with respect to the vehicle based on signals from the first inertial measurement device and the one or more second ranging radios; and
      when the first dismount localization system is within the interior of the vehicle, initialize and align the first inertial measurement device based on signals from the one or more second ranging radios indicative of communications between the first and second ranging radios,
   wherein the second computing device is further configured to automatically determine when the first dismount localization system is within the interior or away from the vehicle based on the signals from the one or more second ranging radios indicative of communications between the first and second ranging radios.

* * * * *